(12) United States Patent
Li et al.

(10) Patent No.: US 10,321,784 B2
(45) Date of Patent: Jun. 18, 2019

(54) GRILL DEVICE

(71) Applicant: Tsann Kuen (Zhangzhou) Enterprise Co., Ltd., Zhangzhou (CN)

(72) Inventors: Chun-Hua Li, Zhangzhou (CN); Qing-Hui Wu, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 668 days.

(21) Appl. No.: 14/614,619

(22) Filed: Feb. 5, 2015

(65) Prior Publication Data

US 2015/0144007 A1 May 28, 2015
US 2017/0231424 A9 Aug. 17, 2017

Related U.S. Application Data

(60) Continuation-in-part of application No. 14/093,653, filed on Dec. 2, 2013, now Pat. No. 9,006,615, which is a division of application No. 13/384,399, filed as application No. PCT/CN2010/075074 on Jul. 9, 2010, now abandoned.

(30) Foreign Application Priority Data

Jul. 10, 2009 (CN) .................... 2009 2 0306005 U
Dec. 30, 2014 (CN) .......................... 2014 1 0840575

(51) Int. Cl.
*A47J 37/06* (2006.01)
(52) U.S. Cl.
CPC ................................. *A47J 37/0611* (2013.01)
(58) Field of Classification Search
CPC .................................................. A47J 37/0611
USPC .......... 99/372–380, 331, 423, 327, 332, 335
See application file for complete search history.

(56) References Cited

U.S. PATENT DOCUMENTS

| 2,461,692 | A | * | 2/1949 | Malir, Jr. | ............... | B60K 28/14 |
| | | | | | | 123/146.5 C |
| 3,281,577 | A | * | 10/1966 | Altemiller | ............... | A47J 37/06 |
| | | | | | | 219/474 |
| 3,669,006 | A | * | 6/1972 | Lee, Sr. | ............... | A47J 37/0611 |
| | | | | | | 425/298 |

(Continued)

FOREIGN PATENT DOCUMENTS

CN 103644197 A 3/2014

OTHER PUBLICATIONS

Search Report appended to an Office Action issued to Chinese counterpart application No. 201410840575.4 by the SIPO dated Mar. 23, 2017, with an English translation thereof.

*Primary Examiner* — Ibrahime A Abraham
*Assistant Examiner* — Frederick F Calvetti
(74) *Attorney, Agent, or Firm* — Husch Blackwell LLP

(57) ABSTRACT

A grill device includes a grilling unit, a heating unit, a controlling unit and a switching unit. A second grilling module of the grilling unit (3) is pivotable to a first grilling module between closed and open positions to cover and uncover the first grilling module, respectively. First and second control modules of the controlling unit enable the heating unit to heat the first and second grilling modules with a first heating power and at least the first grilling module with a second heating power, respectively. The switching unit, is configured to be triggered to turn on the first control module when the second grilling module is at the closed position, and to turn on the second control module when it is not triggered.

1 Claim, 6 Drawing Sheets

(56) References Cited

U.S. PATENT DOCUMENTS

| | | | | |
|---|---|---|---|---|
| 3,776,124 A * | 12/1973 | Morley | ............. | A47J 37/0611 99/335 |
| 4,172,973 A * | 10/1979 | Sano | ............. | H01H 23/025 200/315 |
| 4,178,498 A * | 12/1979 | Snyder | ............. | A47J 37/0623 200/17 A |
| 4,217,477 A * | 8/1980 | Matsubara | ............. | G01K 7/24 219/516 |
| 4,267,413 A * | 5/1981 | Reis | ............. | H01H 35/28 200/81.4 |
| 4,885,446 A * | 12/1989 | Liu | ............. | H05B 6/6411 108/142 |
| 5,613,426 A | 3/1997 | Chan | | |
| 6,079,319 A | 6/2000 | Doria | | |
| 6,171,603 B1 * | 1/2001 | Bernardon | ............. | A61K 8/42 424/401 |
| 6,389,959 B1 * | 5/2002 | Robertson | ............. | A47J 37/0611 219/386 |
| 6,399,925 B1 * | 6/2002 | Pickering | ............. | A47J 37/0623 126/211 |
| 7,285,751 B2 * | 10/2007 | Li | ............. | A47J 37/0623 219/386 |
| 7,301,128 B2 * | 11/2007 | Li | ............. | A47J 36/38 219/450.1 |
| 7,960,673 B2 * | 6/2011 | Li | ............. | A47J 36/38 219/450.1 |
| 8,261,657 B2 * | 9/2012 | Serra | ............. | A47J 37/0611 99/380 |
| 9,006,615 B2 * | 4/2015 | Zhan | ............. | A47J 37/0611 219/450.1 |
| 2005/0023115 A1 * | 2/2005 | Vieira | ............. | F24C 3/128 200/39 R |
| 2005/0150751 A1 * | 7/2005 | Matsuyama | ............. | H01H 13/023 200/310 |
| 2007/0017384 A1 * | 1/2007 | Serra | ............. | A47J 37/0611 99/372 |
| 2008/0282905 A1 * | 11/2008 | Savage | ............. | A47J 37/1223 99/408 |
| 2009/0320695 A1 * | 12/2009 | Serra | ............. | A47J 37/0611 99/380 |
| 2012/0152126 A1 * | 6/2012 | Robinson | ............. | A47J 37/0611 99/331 |
| 2012/0198958 A1 * | 8/2012 | Giuliani | ............. | G05G 1/08 74/503 |
| 2014/0076175 A1 * | 3/2014 | Zhan | ............. | A47J 37/0611 99/377 |

* cited by examiner

GRILL DEVICE

CROSS-REFERENCE TO RELATED APPLICATION

This application is a continuation-in-part (CIP) of U.S. patent application Ser. No. 14/093,653 filed on Dec. 2, 2013, which is a division of U.S. patent application Ser. No. 13/384,399 filed on Jan. 17, 2012 and which claims priority of Chinese Application No. 200920306005.1 filed on Jul. 10, 2009, and claims priority of Chinese Application No. 201410840575.4, filed on Dec. 30, 2014.

FIELD

This disclosure relates to a cooking device, more particularly to a grill device.

BACKGROUND

A conventional grill device usually includes pivotally-connected upper and lower grilling modules provided respectively with upper and lower grilling plates. However, when the upper grilling plate uncovers the lower grilling plate, the heating power provided by the upper and lower grilling plates remains unchanged, and thus may be insufficient to cook the food disposed on the upper and lower grilling plates.

SUMMARY

Therefore, the object of the present disclosure is to provide a grill device capable of cooking food with different powers.

According to this disclosure, a grill device includes a grilling unit, a heating unit, a controlling unit and a switching unit. The grilling unit includes a first grilling module and a second grilling module. The second grilling module is pivotally connected to the first grilling module, and is pivotable with respect to the first grilling module between a closed position, where the second grilling module covers the first grilling module, and an open position, where the second grilling module uncovers the first grilling module. The heating unit is for heating the first and second grilling modules. The controlling unit is electrically connected to the heating unit and includes first and second control modules. The first control module is for enabling the heating unit to heat the first and second grilling modules with a first heating power. The second control module s for enabling the heating unit to heat at least the first grilling module with a second heating power that is greater than the first heating power. The switching unit is mounted to one of the first and second grilling modules, is configured to be triggered by the other one of the first and second grilling modules to turn on one of the first and second control modules when the second grilling module is at one of the closed position and the open position, and is configured to turn on the other one of the first and second control modules when the switching unit is not triggered.

BRIEF DESCRIPTION OF THE DRAWINGS

Other features and advantages of the present disclosure will become apparent in the following detailed description of the embodiment of the disclosure, with reference to the accompanying drawings, in which.

DETAILED DESCRIPTION

Figure 1:
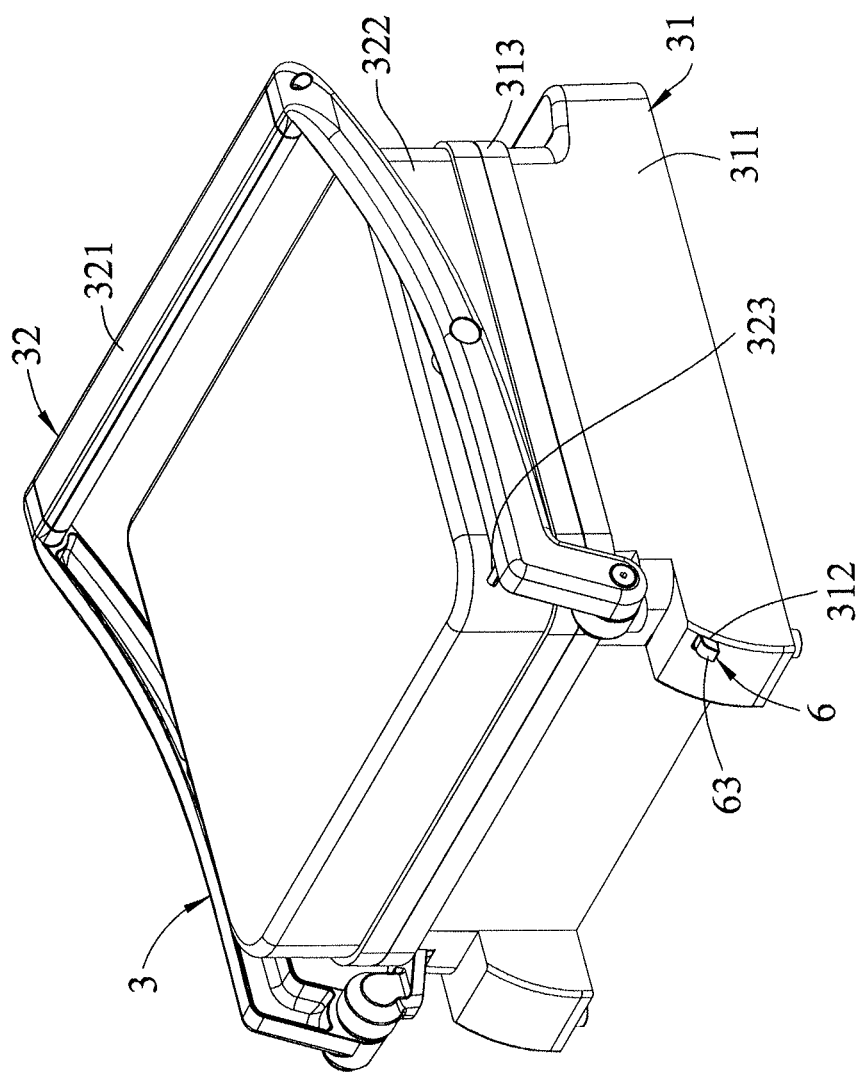
FIG. 1 is a perspective view of an embodiment of a grill device according to the present disclosure for illustrating a second grilling module at a closed position.
Figure 2:
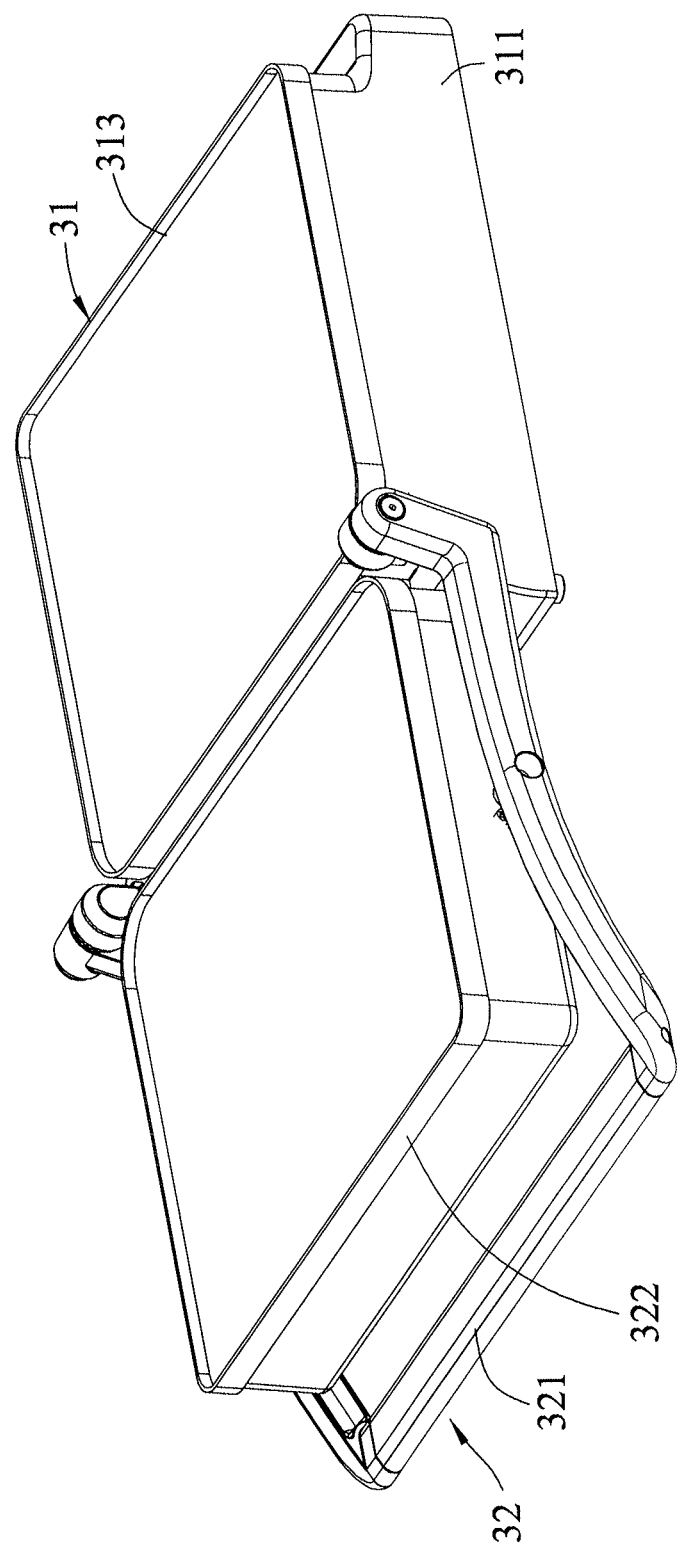
FIG. 2 is a perspective view of the embodiment for illustrating the second grilling module at an open position.
Figure 3:
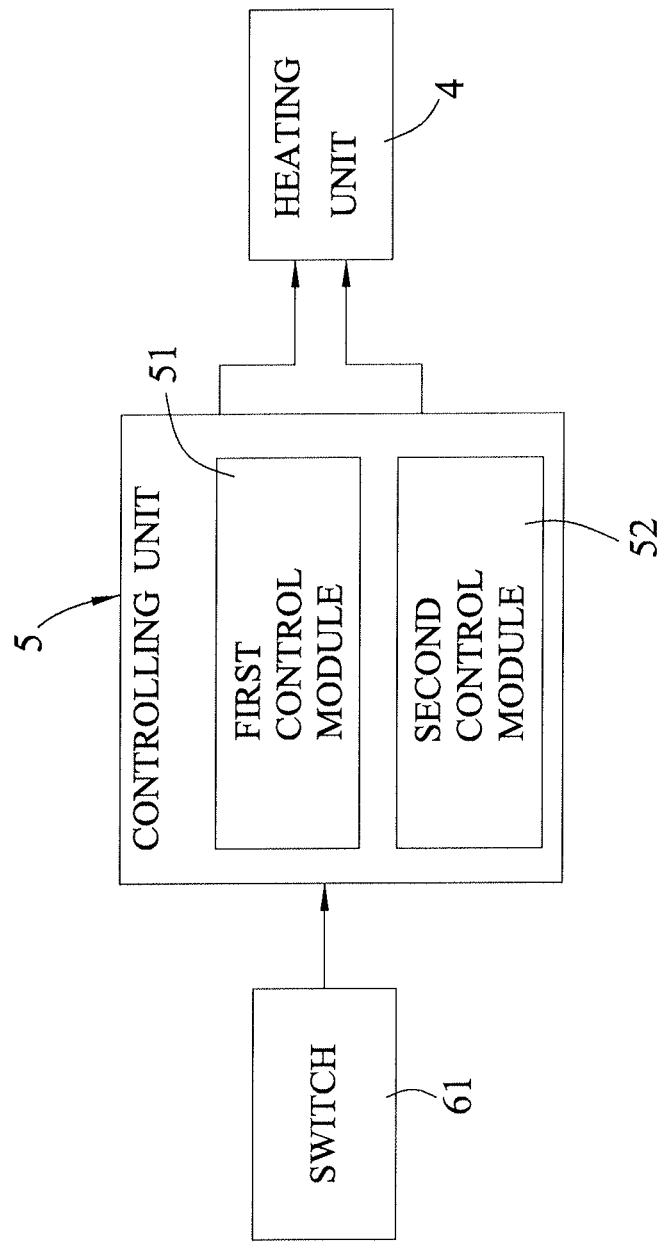
FIG. 3 is a block diagram illustrating electrical components of the embodiment.

Referring to FIGS. 1 to 3, the embodiment of the grill device according to the present disclosure includes a grilling unit 3, a heating unit 4, a controlling unit 5 and a switching unit 6. The grilling unit 3 includes a first grilling module 31 and a second grilling module 32. The heating unit 4 is configured for heating the first and second grilling modules 31, 32. Since the feature of this disclosure does not reside in the configuration of the heating unit 4, further details of the same are omitted hereinafter for the sake of brevity.

The first grilling module 31 includes a base housing 311 and a first grilling plate 313. The base housing 311 is formed with a mounting hole 312. The first grilling plate 313 is mounted on the base housing 311.

The second grilling module 32 includes a handle 321, a second grilling plate 322 and a pushing member 323. The handle 321 is pivotally connected to the base housing 311 at a position adjacent to the mounting hole 312, and is user-operable to rotate the second grilling module 32 between a closed position, where the second grilling module 32 covers the first grilling module 31, and an open position, where the second grilling module 32 uncovers the first grilling module 31. In this embodiment, the handle 321 has a U-shaped configuration.

The second grilling plate 322 is mounted fixedly to and co-rotatable with the handle 321, and covers the first grilling plate 313 of the first grilling module 31 when the second grilling module 32 is at the closed position. Note that the second grilling plate 322 can be disposed horizontally to the first grilling plate 313 for cooking food placed thereon when the second grilling module 32 is disposed at the open position. The pushing member 323 is mounted on the handle 321 for pushing the switching unit 6. The pushing member 323 is in a form of a rod having a connecting end that is connected to the handle 321, and a free end that extends from the connecting end away from the handle 321 for pushing the switching unit 6 when the second grilling module 32 is at the open position.

The controlling unit 5 is mounted in the base housing 311, is electrically connected to the heating unit 4, and includes first and second control modules 51, 52. The first control module 51 is configured for enabling the heating unit 4 to heat the first and second grilling plates 313, 322 with a first heating power. The second control module 52 is configured for enabling the heating unit 4 to heat at least the first grilling plate 313 with a second heating power that is greater than the first heating power. In this embodiment, the second control module 52 is configured for enabling the heating unit 4 to heat the first and second grilling plates 313, 322 with the second heating power.

Figure 4:
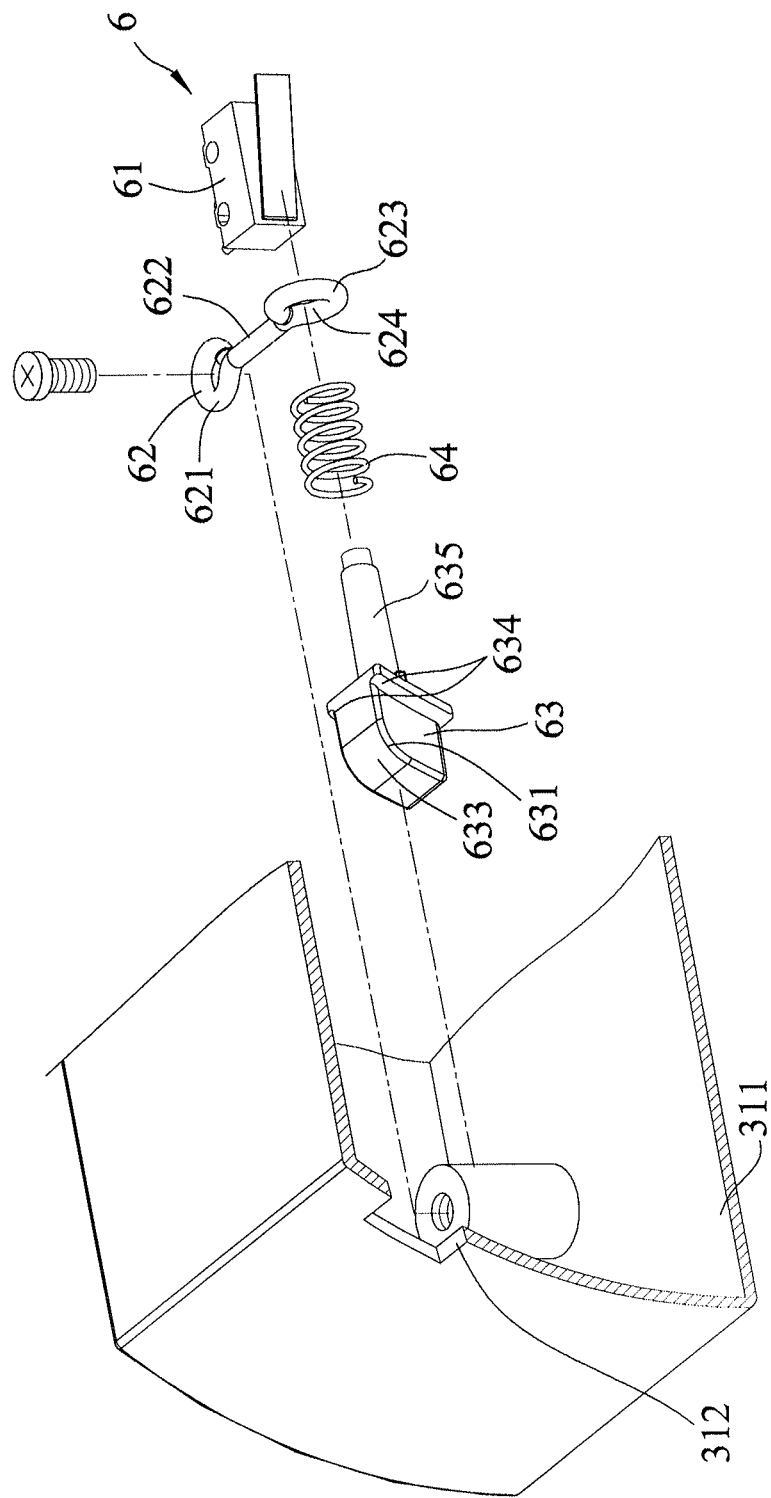
FIG. 4 is a fragmentary and exploded perspective view for illustrating components of a switching unit of the embodiment.
Figure 5:
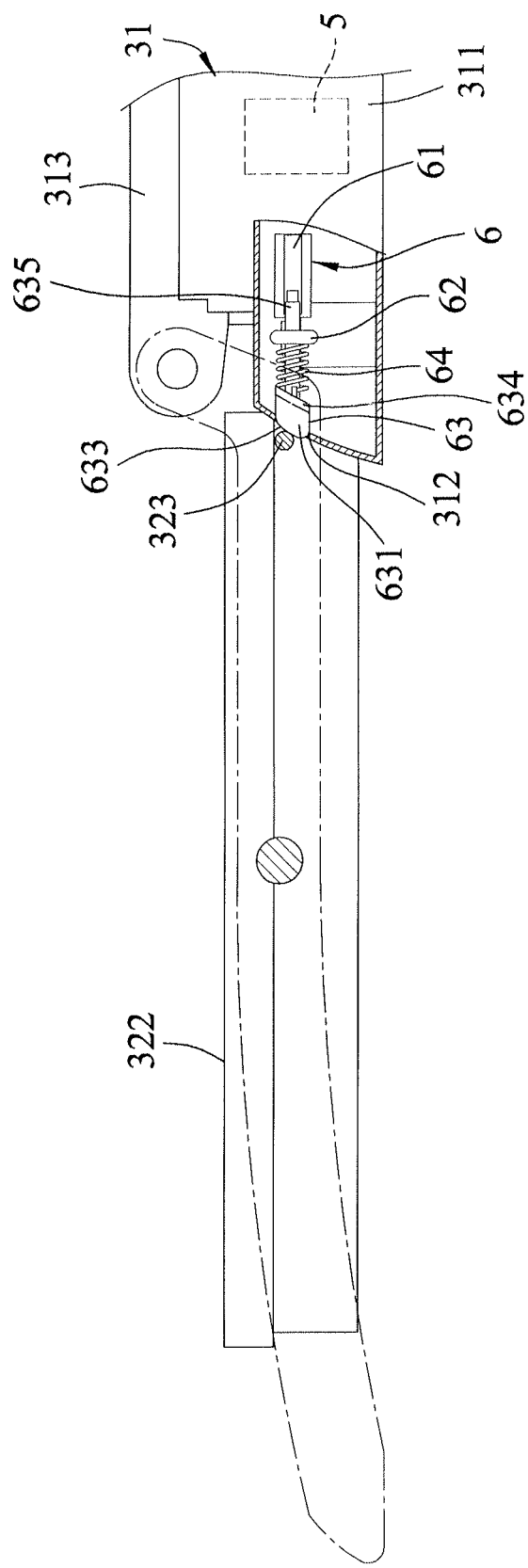
FIG. 5 is a schematic fragmentary sectional view of the embodiment for illustrating the second grilling module at the open position and the switching unit being triggered.
Figure 6:
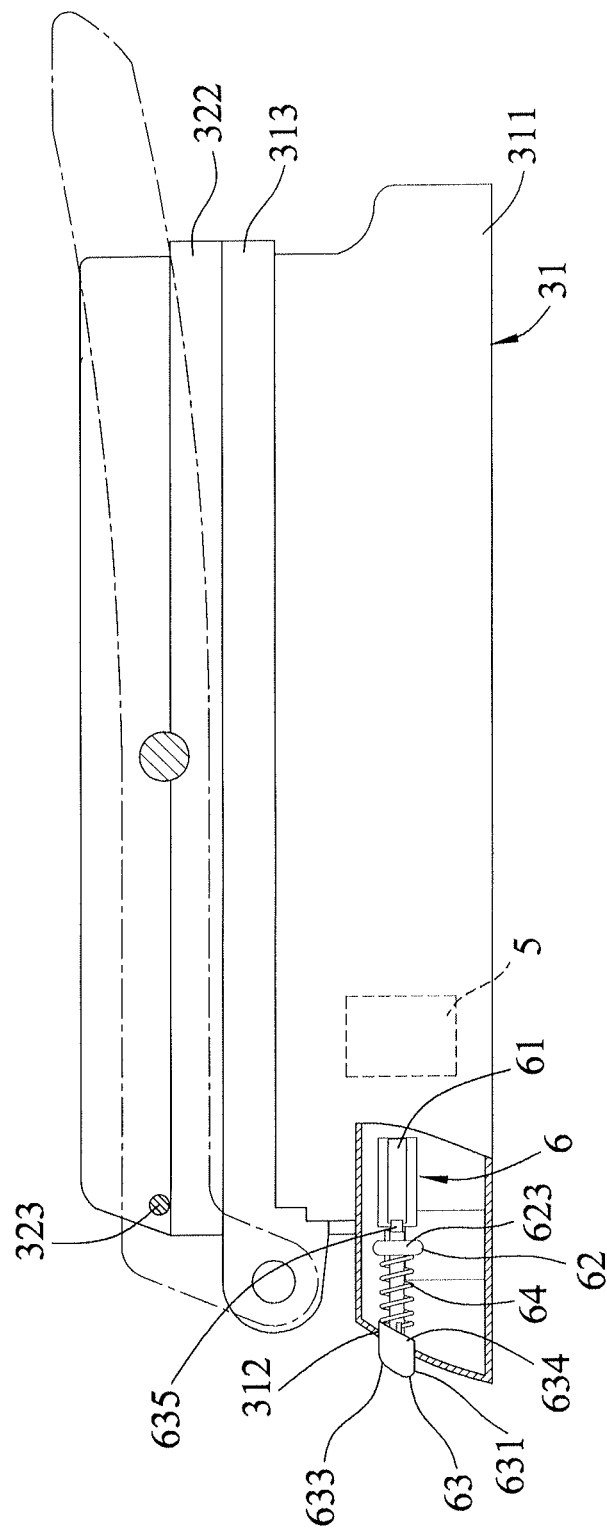
FIG. 6 is a schematic sectional view of the embodiment for illustrating the second grilling module at the closed position and the switching unit being released.

Further referring to FIGS. 4 to 6, the switching unit 6 is disposed at the base housing 311, is electrically connected to the controlling unit 5, and includes a switch 61, a guiding element 62, a trigger element 63 and a biasing member 64. It should be rioted herein that the switching unit 6 may be disposed on the second grilling module 32 instead in other embodiments of this disclosure.

The switch 61 is configured for alternatively turning on the first and second control modules 51, 52. Specifically, the switch 61 is configured to turn on the second control module 52 and turn off the first control. module 51 when the second grilling module 32 is at the open position, and to turn on the first control module 51 and turn off the second control module 52 when the second grilling module 32 is not at the open position. In this embodiment, the switch 61 is a micro-switch, and the disclosure is not limited to this aspect.

The guiding element 62 includes a connecting segment 621, an interconnecting segment 622 and a directing segment 623. The connecting segment 621 is connected stably to the base housing 311. The interconnecting segment 622 interconnects the connecting segment 621 and the directing segment 623. The directing segment 623 defines a guiding hole 624.

The trigger element 63 includes a button 631, a flange portion 634 and a rod 635. The button 631 is exposed outwardly of the base housing 311 from the mounting hole 312, and has a curved surface 633 facilitating the pushing member 323 of the second grilling module 32 to glidingly push the button 631 to move toward the switch 61. The rod 635 is connected to the button 631, and extends through the guiding hole 624 of the directing segment 623 toward the switch 61 for actuating the switch 61. The flange portion 634 of the trigger element 63 is formed between the rod 635 and the button 631, is disposed in the base housing 311, and has a dimension lager than that of the mounting hole 312 for preventing the trigger element 63 from departing from the base housing 311.

The biasing member 64 is sleeved on the rod 635, and is sandwiched between the directing segment 623 and the button 631 for biasing the trigger element 63 away from the switch 61. It should be noted that the biasing member 64 is a compression spring in this embodiment, and can be modified to be an extension spring disposed between the base housing 311 and the trigger element 63.

The button 631 of the trigger element 63 is pushed toward the switch 61 by the pushing member 323 to counteract the biasing force of the biasing member 64 during rotation of the second grilling module 32 from the closed position to the open position. When the second grilling module 32 is disposed at the open position (see FIGS. 2 and 5), the switch 61 is pressed and actuated by the rod 635 of the trigger member 63 to turn off the first control module 51 and turn on the second control. module 52. At this time, the heating unit 4 is controlled by the second control module 52 to heat the first and second grilling plates 313, 322 with the second heating power.

On the other hand, the trigger element 63 is biased by the biasing member 64 away from the switch 61, such that the switch 61 is released from being pushed against; by the trigger element 63 and is configured to turn on the first control module 51 and turn off the second control module 52 when the second grilling module 32 is disposed at the closed position with the trigger element 63 released from contact with the pushing member 323 (see FIGS. 1 and 6). The heating unit 4 is then controlled by the first control module 51 to heat the first and second grilling plates 313, 322 with the first heating power.

To sum up, in the present disclosure, by virtue of the controlling unit 5 and the switching unit 6, the heating unit 4 enables the first and second grilling plates 313, 322 to cook food disposed thereon with different heating powers when the second grilling module 32 is disposed at the open and closed positions. By this way, the first and second grilling plates 313, 322 can cook food with the second heating power greater than the first heating power when the second grilling module is disposed at the open position. Accordingly, the temperature of the first and second grilling plates 313, 322 can remain and will not drop when the second grilling module 32 is disposed at the open position, such that the first and second grilling plates 313, 322 can provide sufficient heat for cooking food.

While the present disclosure has been described in connection with what is considered the exemplary embodiment, it is understood that this disclosure is not limited to the disclosed embodiment but is intended to cover various arrangements included within the spirit and scope of the broadest interpretations and equivalent arrangements.

What is claimed is:

1. A grill device comprising:
   a grilling unit that includes
      a first grilling module including a first grilling plate, and
      a second grilling module pivotally connected to said first grilling module, and being pivotable with respect to said first grilling module between a closed position, where said second grilling module covers said first grilling module, and an open position, where said second grilling module uncovers said first grilling module, wherein said second grilling module includes a handle pivotally connected to said first grilling module and user-operable to rotate said second grilling module between the open and closed positions, a second grilling plate mounted fixedly to and co-rotatable with said handle and covering said first grilling plate when said second grilling module is at the closed position, and a pushing member mounted on said handle;
   a heating unit for heating said first and second grilling modules;
   a controlling unit that is electrically connected to said heating unit and that includes:
      a first control module for enabling said heating unit to heat said first and second grilling modules with a first heating power;
      a second control module for enabling said heating unit to heat at least said first grilling module with a second heating power that is greater than the first heating power; and
   a switching unit that is mounted to said first grilling module, and that includes
      a switch disposed in said first grilling module and configured for alternately turning on said first and second control modules,
      a trigger element including a button that is exposed outwardly of said first grilling module that is to be pushed by said pushing member of said second grilling module at the open position, and a rod that is connected co-movably to said button, that extends into said first grilling module toward said switch, and that is brought to press and actuate said switch to turn off said first control module and turn on said second control module when said pushing member pushes said button to move together with said rod toward said switch as said second grilling module is disposed at the open position, a compression spring for biasing said trigger element away from said switch, such that said switch is released from being pushed against by said trigger element and turns on said first control module and turns off said second control module when said second grilling module is disposed at the closed position with said trigger element released from being pushed by said second grilling module, said pushing member of said second grilling module counteracting the biasing force of said compression spring during rotation of said second grilling module from the closed position to the open position, and a guiding element including a directing segment that defines a guiding hole through which said rod extends, a connecting segment that is connected stably to said first grilling module, and an interconnecting segment that interconnects said connecting segment and said directing segment;

wherein said compression spring is sleeved on said rod and is sandwiched between said directing segment and said button for biasing said trigger element away from said switch;

said first grilling module includes a base housing formed with a mounting hole through which said rod extends and from which said button is exposed;

said trigger element further includes a flange portion formed between said rod and said button, disposed in said base housing, and having a dimension larger than that of said mounting hole for preventing said trigger element from departing from said base housing;

said first grilling plate is mounted on said base housing, said handle of said second grilling module being pivotally connected to said base housing of said first grilling module; and said button is configured to have a curved surface facilitating said pushing member of said second grilling module to glidingly push said button during the rotation of said second grilling module.

* * * * *